Figures 1, 2:
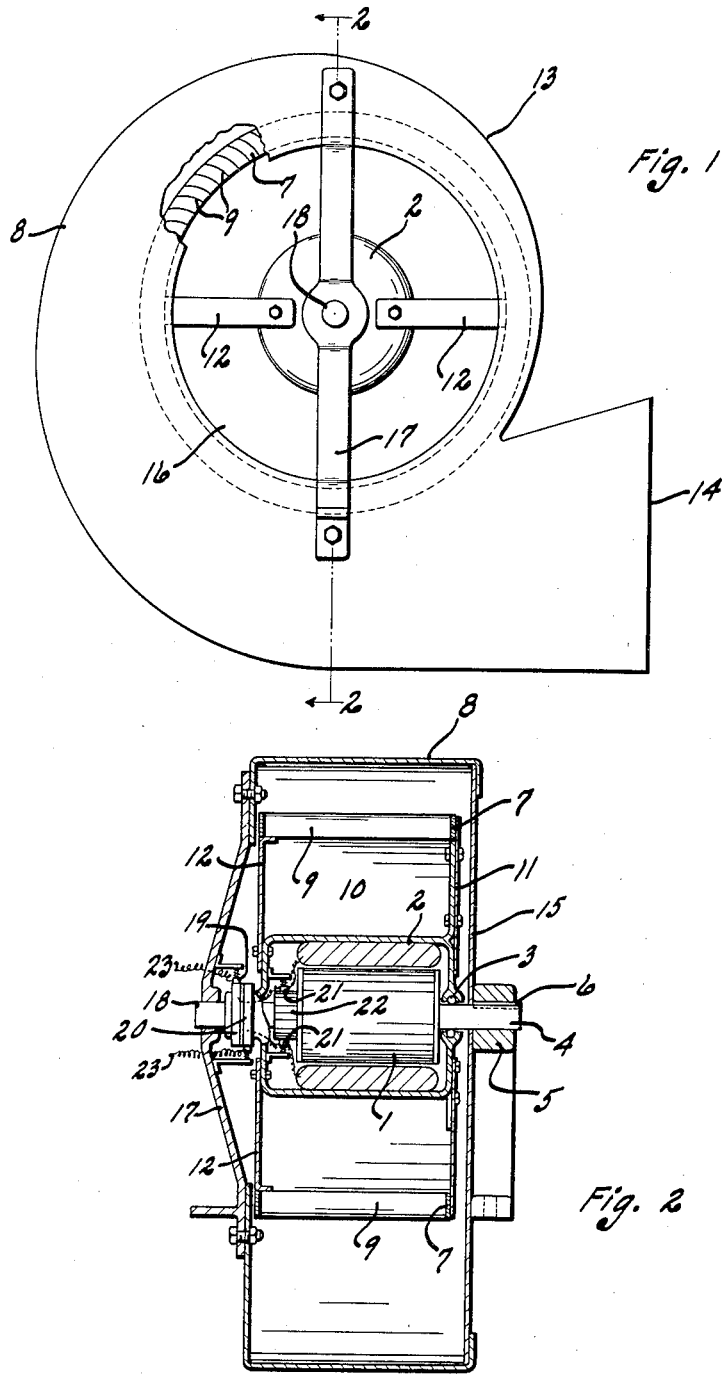

Aug. 8, 1933.          C. W. COLBY          1,921,218
FAN
Filed Feb. 29, 1932

INVENTOR
Clyde W. Colby
BY
Brockett, Hyde, Higley & Meyer
ATTORNEYS

Patented Aug. 8, 1933

1,921,218

UNITED STATES PATENT OFFICE 1,921,218

FAN

Clyde W. Colby, East Cleveland, Ohio

Application February 29, 1932. Serial No. 595,761

1 Claim. (Cl. 230—117)

This invention relates to blower units of the class wherein the blower comprises a runner of squirrel cage form and a volute casing therefor, and an electric motor is provided for driving the runner.

The object of the invention is to provide such a unit with the parts thereof so arranged that the unit shall occupy a minimum of space in one direction—to the end that the unit may have application in confined places such as in wall panel heating and ventilating installations.

Briefly the invention comprises locating the motor within the runner of the blower so that the motor stator and rotor parts and the blower runner and casing parts are all coaxial or annularly related; that, the endwise dimensions of all being approximately equal, the total endwise dimension of the unit need be no greater than that of its longest part.

According to my invention the runner is carried by the rotor part of the motor to move therewith, and this rotor part is preferably arranged about the stator part. Thus, so far as the motor is concerned, the manner of functioning of its principal parts is reversed from the usual practice.

The exact nature of this invention together with further objects and advantages thereof will be apparent from the following description taken in connection with the accompanying drawing, in which Figs. 1 and 2 are conventionalized showings in inlet end elevation and transverse section respectively, of an embodiment of the invention.

With reference now to the drawing, the motor indicated is of direct current type although it will be appreciated that in actual practice it will usually be preferable that the motor be of alternating current type. At any rate the the principal parts of the motor are an armature member 1 and a cooperative field member 2 positioned thereabout for relative rotation thereupon on bearings therebetween indicated at 3. In the usual motor the outer member 2 is stationary and called the stator, and the inner member 1 is rotated and called the rotor. In this application, however, it is preferable that the inner member be fixed and the outer member revolved thereabout. Thus the shaft 4 is fixed in a supporting bracket 5 as by a key 6 and is, therefore, actually the stator part of the motor.

The principal blower parts are a runner 7 and casing 8 therefor.

The runner 7 is of the usual squirrel cage type having blades 9 arranged in spaced relation to form an annulus of diameter considerably larger than that of the motor; so that the runner may be positioned about the motor concentric therewith to be driven by the rotor thereof, and still leave an annular space 10 about the motor. The runner is mounted upon the rotor as by a disk 11 at one end of these parts and spider members 12 at the opposite end, both the disk and the arms of said spider being shown as bolted to the rotatable motor housing, and having their peripheral portions secured with the runner 7.

The casing 8, arranged about the runner, is generally of the usual volute form having a spiral peripheral wall 13 and a tangential outlet opening 14, with one end 15 closed and having at its other end an inlet opening 16. The opening 16 is circular as usual and of diameter approximately equal to the inner diameter of the runner, so that the annular space 10 within the runner has an open inlet end, the other end being closed by the disk 11.

A bracket 17 may be secured with the casing 8 to extend across the opening 16 and provide bearing for the corresponding end of the motor shaft 4 as indicated at 18.

The bracket 17 may serve to carry a pair of contactors 19 cooperative with a pair of collector rings 20 mounted on the shaft 4 and each electrically connected to one of the usual brushes 21 which bear upon the commutator 22 of the motor armature; whereby the motor may have current supply from wires 23 leading to the contactors 19.

What I claim is:

In apparatus of the class described, a motor unit comprising cooperative rotor and stator parts and a blower unit comprising cooperative runner and casing parts, said stator part being arranged to extend concentrically of said casing, through the hollow thereof, with its ends secured with the casing side walls, said rotor part having end bearings upon said stator part and said runner part being arranged within said casing about said rotor part and having supporting connections therewith at its ends.

CLYDE W. COLBY.